J. D. PARK.
TRACTOR TREAD SHOE.
APPLICATION FILED DEC. 16, 1918.
1,375,315.
Patented Apr. 19, 1921.
3 SHEETS—SHEET 1.
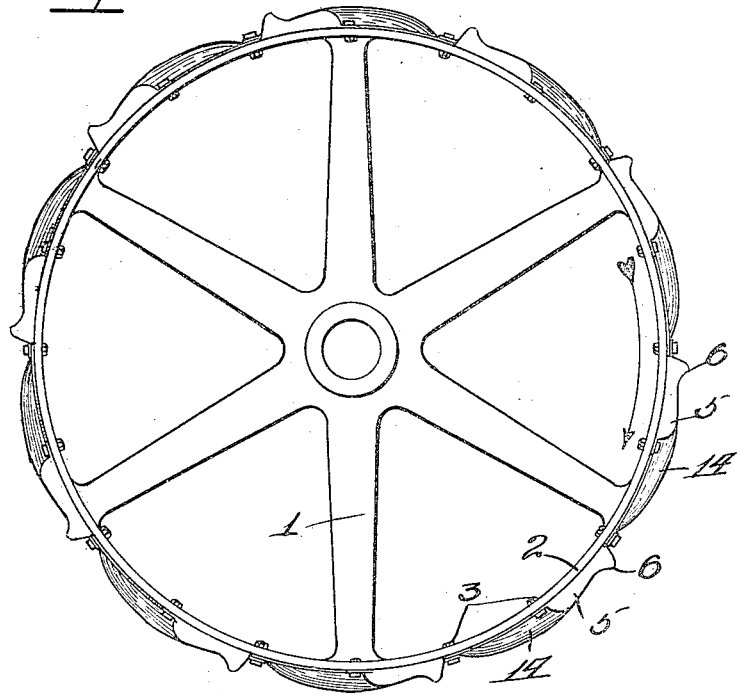
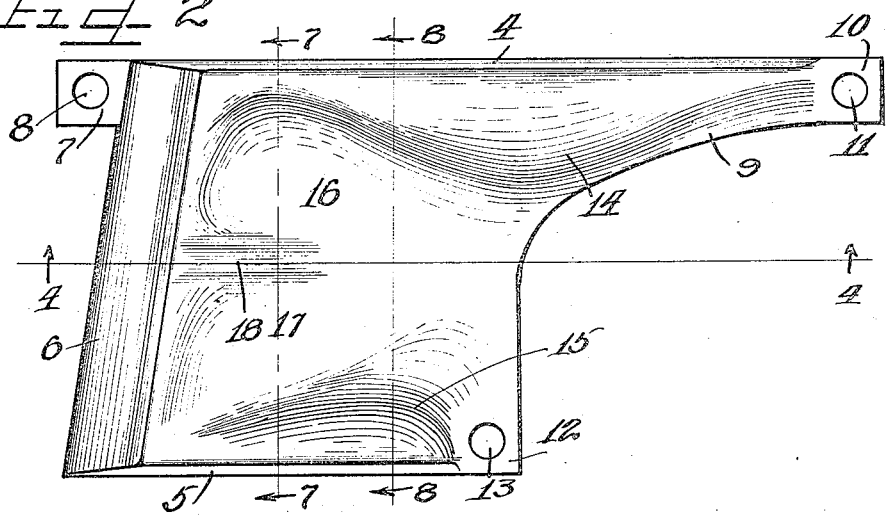

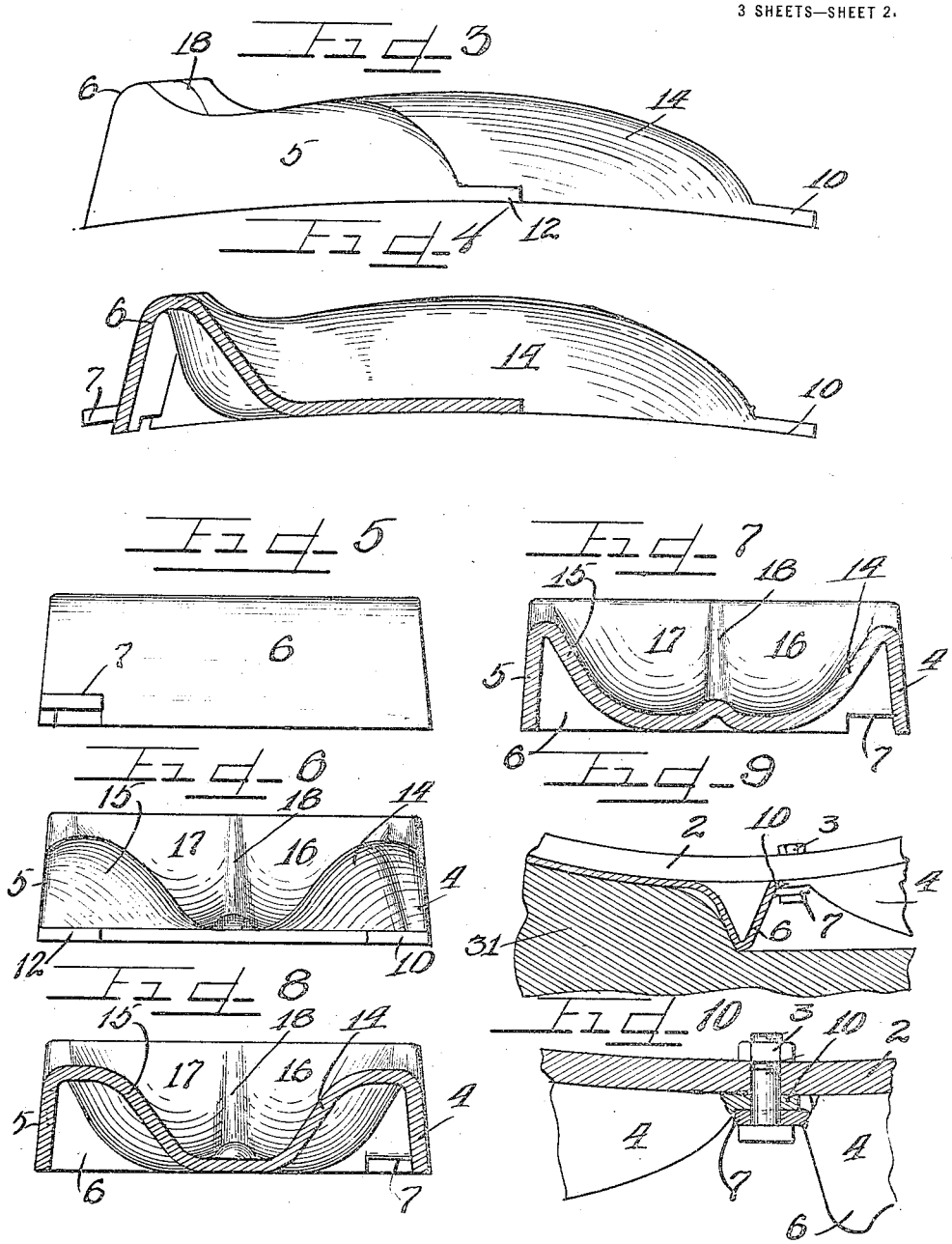

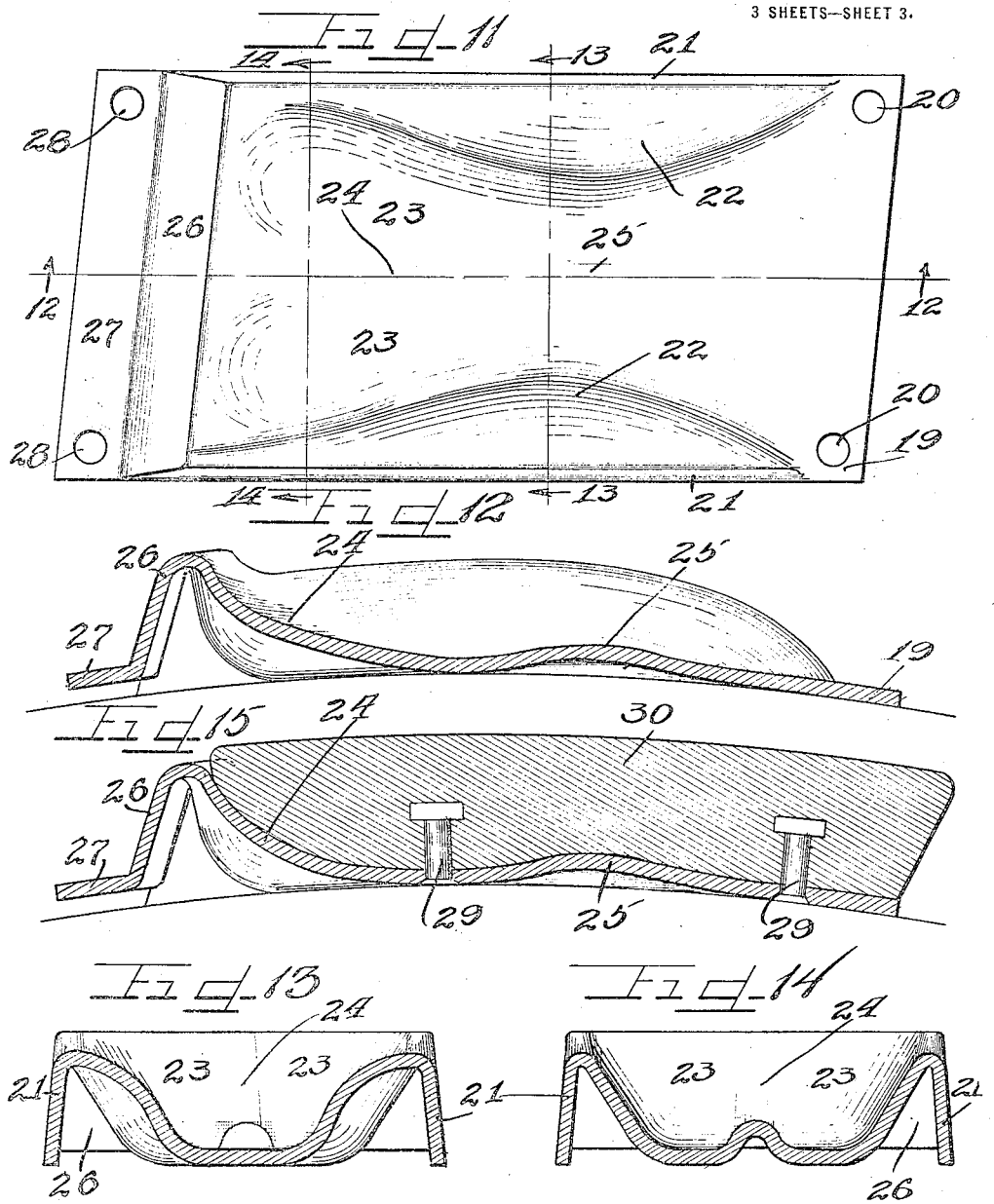

UNITED STATES PATENT OFFICE.

JAMES D. PARK, OF DULUTH, MINNESOTA.

TRACTOR TREAD-SHOE.

1,375,315.   Specification of Letters Patent.   Patented Apr. 19, 1921.

Application filed December 16, 1918. Serial No. 266,953.

*To all whom it may concern:*

Be it known that I, JAMES D. PARK, a citizen of the United States, and a resident of the city of Duluth, in the county of St. Louis and State of Minnesota, have invented certain new and useful Improvements in Tractor Tread-Shoes; and I do hereby declare that the following is a full, clear, and exact description of the same, reference being had to the accompanying drawings, and to the numerals of reference marked thereon, which form a part of this specification.

This invention relates to an improved form of tractor tread or shoe, which is so constructed that when the same is attached to a tractor wheel rim and is brought in contact with a soft or muddy area, portions of the soft mud directly under the shoe are temporarily held confined in pockets formed in the shoe and packed to afford a substantial gripping area for a transverse rib forming a part of the shoe.

It is an object of this invention to provide a tractor tread adapted to be removably secured upon the rim of a tractor wheel.

It is an important object of the invention to construct a tractor tread shoe of simple and effective construction for mounting on the tread surface of a tractor wheel, and adapted to pocket and pack the ground over which the tractor is run to provide a packed foothold for a diagonal heel rib forming a part of said shoe.

Other and further important objects of the invention will be found in the disclosures in the drawings and specification.

The invention (in a preferred form) is illustrated in the drawings, and hereinafter more fully described.

On the drawings:

Figure 1 is a side elevation of a tractor wheel equipped with tread shoes embodying the principles of this invention.

Fig. 2 is a plan view of the tread surface of one of the shoes.

Fig. 3 is a side elevation thereof.

Fig. 4 is a sectional view taken on line 4—4 of Fig. 2.

Fig. 5 is a rear end elevation of the shoe.

Fig. 6 is a front end elevation thereof.

Fig. 7 is a section taken on line 7—7 of Fig. 2.

Fig. 8 is a section taken on line 8—8 of Fig. 2.

Fig. 9 is a detail view of a fragmentary portion of the tractor wheel rim showing a sectional portion of a tread shoe with the heel gripping against the entrapped packed earth affording a foothold for the tractor wheel.

Fig. 10 is a fragmentary section of the tractor wheel rim showing the method of attaching the tread shoes in overlapping relation.

Fig. 11 is a plan view of the tread surface of a modified form of tread shoe.

Fig. 12 is a section taken on line 12—12 of Fig. 11.

Fig. 13 is a section taken on line 13—13 of Fig. 11.

Fig. 14 is a section taken on line 14—14 of Fig. 11.

Fig. 15 is a longitudinal central section of the tire shoe shown in Fig. 11, equipped with a solid rubber tread pad or tire member.

As shown on the drawings:

The reference numeral 1, indicates a tractor wheel provided with an apertured flat rim 2, on the outer tread surface of which are removably secured by means of bolts 3, or other suitable means, a plurality of overlapping circumferentially disposed tread shoes embodying the principles of this invention.

The tread shoe is of unitary or one-piece construction and is preferably stamped or formed out of sheet metal. As clearly shown, each tread shoe comprises a body portion of novel shape embracing a long side wall 4, and a short side wall 5, connected to each other at one end of the tread shoe by means of an integral heel or rib 6, of a substantially V-shaped cross section, and disposed at an angle with respect to the longitudinal center line of the tread shoe, as clearly illustrated in Fig. 2. The transverse inclined heel 6, forms the rear end of the tread shoe, and has integrally formed on the rear lower portion thereof at the end of the long side wall 4, a rearwardly projecting attaching portion 7, having an opening or aperture 8, therein, to permit the projection of an attaching bolt 3, therethrough. Integrally formed at the front reduced end 9, of the body portion of the tread shoe is a second attaching portion 10, provided with an aperture 11. At the opposite side of the tread shoe and at the front end of the short side wall is another integral attaching portion 12, having an opening 13, therein. The attaching lug 12, is disposed approximately half way between the lugs 7 and 10, and on the opposite side of the tread shoe.

The body of the tread shoe is formed with a large rounded portion or cheek 14, adjacent and to the inside of the long wall 4, and said cheek tapers off toward both ends of the tread shoe in gradual smooth corners. Formed in the body of the tread shoe adjacent and to the inside of the short side wall 5, is a smaller rounded portion or cheek 15, also smoothly rounded and together with the large cheek 14, providing pockets 16 and 17, partially separated from each other at the inside of the middle portion of the heel 6, by a short longitudinal ridge or rib 18.

Figs. 11 to 14, inclusive, disclose a modified form of tread shoe which is stamped from sheet metal to form a one-piece construction of novel shape embracing a body portion in the shape of a parallelogram, one end of which affords an attaching flange or plate 19, provided with openings or apertures 20, near the ends or corners thereof. The sides of the tread shoe are formed to provide side walls 21, to the inside of each of which is formed a rounded portion or cheek 22, which tapers toward both ends and affords pockets 23, in the body of the tread shoe. Formed longitudinally in the center of the shoe body near the rear portion is a dividing wall or rib 24, which partially separates the pockets 23. The middle part of the tread shoe body is shaped or bent to form an elevated ridge or rib 25, which also serves to partially separate the pockets 13. Integrally formed laterally across the rear end of the tread shoe body and opposite the attaching flange 19, is a substantially V-cross-sectioned rib or heel 26, having integrally formed along the lower outer edge thereof an attaching flange or plate 27, provided with openings or apertures 28, near the corners thereof. The attaching flange 27, is positioned a short distance above the attaching surface of the tread shoe to permit adjacent tread shoes when mounted to overlap each other with the flange 27, of one shoe resting on the flange 19, of the other shoe, so that retaining bolts may be engaged through the registering apertures of said flanges to permit attachment of the tread shoes to the tread surface of a tractor wheel rim.

If preferred, the body of the tread shoe may be apertured to receive screw bolts 29, for securely holding a rubber tire pad 30, seated within the pockets 23, of the tread shoe, as clearly shown in Fig. 15.

The operation is as follows:—

As shown in Figs. 4 and 12, both forms of the tractor tread shoes are slightly curved or arc shaped to permit the same to conform to the curvature of a tractor wheel rim to which they are adapted to be attached by means of bolts 3, in overlapping relation as shown in Fig. 1, circumferentially around the wheel rim to afford an improved tractor wheel tread.

The tread shoes may be of any desired width to fit the width of a wheel rim to which they are to be attached. The novel form of the tread shoes when attached in place on a tractor wheel rim serves to pack the ground over which the wheel is run so as to afford a substantial foothold to permit the heels of the tread shoes to engage the packed ground to facilitate the advance of a tractor over muddy roads and over soft and soggy ground.

When the tractor wheel is rotated in the direction of the arrow of Fig. 1, the reduced front end of a tread shoe first engages the ground and the front end of the cheek 14, directs the wet or soggy soil into the restricted opening at the front ends of the pockets 16 and 17. The pockets receive the soil and act to hold the same confined therein to permit the entrapped soil to be compressed or packed to furnish a substantial foothold or solid gripping area for the diagonally disposed heel 6, of the tread shoe as shown in Fig. 9, where the reference numeral 31, represents soft or soggy ground over which the tractor wheel is run.

The peculiar construction of the tread shoe when run over soft ground, holds portions of the soil directly underneath the tractor wheel rim confined to permit packing of the entrapped soil, and thus prevent the same from being squeezed or forced laterally beyond the sides of the tractor wheel rim.

The modified form of tread shoe shown in Fig. 11, serves to entrap soil and pack the same in a manner similar to that already described. The mounting of the modified forms of tread shoes on the rim of a tractor wheel is believed to be self-evident.

Upon certain roads it may be unnecessary to use the form of tread shoes shown in Fig. 11, and in such cases, rubber tread packs 30, may be securely seated in the tread shoes by means of the attaching screw bolts 29, or in any other suitable manner.

In the claims I have used the words descriptive of directions with the following meanings; centripetal, toward the center of the wheel to which the tread shoe is applied; centrifugal, away from said center; medial, toward the middle line of the circumference of said wheel; rearward toward that end of the shoe which in the normal progress of the wheel contacts last with the ground. Each of these words, when applied to a shoe without specifying that the shoe is attached to a wheel, I intend to be understood as describing the same direction relative to the shoe as it would describe if the shoe were attached to the wheel.

I claim as my invention:

1. A tractor wheel tread shoe comprising a body portion, centrifugally and medially inclined side walls on the body portion, a centrifugally and forwardly inclined heel piece extending across one end of the body portion and connecting the side walls, and rounded cheeks integral with the side walls and heel piece and forming pockets with the body portion wherein the surface engaged by the wheel is entrapped and packed.

2. A tractor wheel tread shoe comprising a body portion, centrifugally converging side walls integral with the body portion, an inclined heel piece connecting the side walls, and cheeks forming pockets in the body portion adapted to entrap and pack the surface engaged by the wheel.

3. A tractor wheel tread shoe comprising centrifugally converging side walls, apertured projections integral with the side walls, a heel piece connecting the side walls, cheeks along the side walls forming a rounded pocket, and a central rib extending from the heel piece and integral with the body portion.

4. A one-piece tractor wheel tread shoe comprising a body portion, side walls integral therewith, cheeks formed in said body portion on the medial side of said side walls to form pockets in said body portion, a heel member integrally formed across one end of said body portion, and apertured attaching means on said body portion and on said heel member to permit mounting of the tread shoe on the rim of a tractor wheel.

5. A tractor wheel tread shoe having side walls and a saddle-shaped surface between said walls.

6. A tractor wheel tread shoe having side walls, a rear wall, and curved surfaces connecting the centrifugal edges of said walls with the floor of the shoe, the surfaces between the side walls and the floor having a line of inflexion.

7. A tractor wheel tread shoe having a floor, a rear wall and a curved surface connecting the centrifugal edge of the rear wall with the floor, said surface having a ridge convex centrifugally extending longitudinally of the shoe.

In testimony whereof I have hereunto subscribed my name in the presence of a subscribing witness.

JAMES D. PARK.

Witness:
EARL M. HARDINE.